Figure 1:
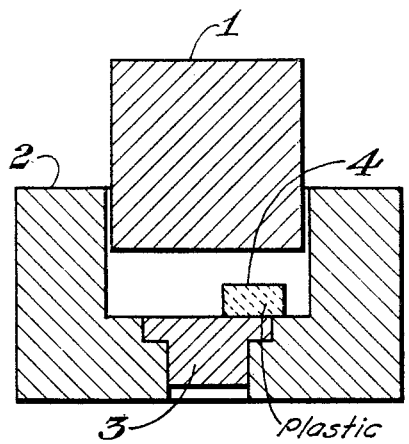

Dec. 17, 1940.  R. D. LOWRY  2,224,852

MOLDING POLYSTYRENE AND RELATED RESINS

Filed June 28, 1938

INVENTOR
Robert D. Lowry
BY Griswold & Burdick
ATTORNEYS

Patented Dec. 17, 1940

2,224,852

UNITED STATES PATENT OFFICE 2,224,852

MOLDING POLYSTYRENE AND RELATED RESINS

Robert D. Lowry, Midland, Mich., assignor to The Dow Chemical Company, Midland, Mich., a corporation of Michigan Application June 28, 1938, Serial No. 216,287

10 Claims. (Cl. 18—55)

This invention concerns an improved method of molding resinous polymers and co-polymers of styrene and its analogues, whereby molded articles of exceptional strength may be produced. By an "analogue" of styrene is meant a vinyl aromatic compound such as ortho-methyl styrene, para-methyl styrene, ortho-ethyl styrene, para-chloro styrene, para-bromo styrene, divinyl benzene, or vinyl naphthalene, etc., which, like styrene, may be polymerized to form a thermoplastic resin. For convenience, such resinous polymers are hereinafter referred to generically as "styrol resins."

It is well known that polystyrene may be molded under application of heat and pressure to form objects of desired shape. Two methods have been employed to effect the molding. The usual method has been to fill a mold of the plunger type with powdered or otherwise comminuted polystyrene and thereafter heat the material at a temperature above 120° C., usually about 160° C., while applying sufficient pressure to compress the polystyrene as a uniform body within the mold. Ostromislensky, in U. S. Patent No. 1,683,401, states that the time and temperature of pressing required to produce a satisfactory molded article by this method are dependent on the size of the mold, but that in producing an object of 1 cubic inch size, the molding should be carried out at a temperature of 160° C. and a pressure of 1,000 pounds per square inch for 5–10 minutes. After completing this molding operation the mold is, of course, cooled and the product removed.

The other known method is by injection molding at temperatures between 160° and 220° C. as described in U. S. Patent No. 2,077,542. Affidavits in the file wrapper of this patent show that polystyrene articles prepared by the injection molding method are stronger than corresponding articles prepared by the compression molding method described above. This increased strength is accredited to the flow of polystyrene which occurs during the injection molding.

I have now discovered that polystyrene articles stronger than those obtainable by the heretofore known compression molding method and in many instances stronger than those obtainable by the injection molding process may be produced by compression molding, provided the compression molding operation be carried out in the modified manner hereinafter described. More specifically, I have found that when polystyrene is molded under conditions which permit appreciable flow, the strength of the molded article is dependent not only on the flow which occurs, but also to large extent on the molding temperature, the strength becoming greater as the molding temperature is lowered. Peculiarly, this variance in strength with change in the molding temperature is not nearly so pronounced, when the molding operation is carried out under conditions which do not create appreciable flow of the polystyrene.

The improved compression molding method consists essentially in placing a body of a styrol resin in a mold in such manner that the resin occupies not more than one-half of the cross-sectional area of the mold, so that considerable linear flow of the resin must occur during molding, and thereafter heating the resin at a temperature not exceeding 150° C. while applying sufficient pressure to cause the resin to flow and occupy the desired portion of the mold, forming a uniform body. The mold and its charge are then cooled sufficiently to solidify the resin, preferably to room temperature or thereabout, and the molded article removed.

The initial charge of polystyrene or related resin is preferably a pre-formed billet or block of the resin, since employment of such solid single piece of the material as the charge to the mold results in greater flow than is obtained when using granular or powdered material. However, a granular or otherwise comminuted form of the resin can be used, though less satisfactorily. Maximum flow and maximum strength in the product are obtained when the resin charged to the mold is placed at one extremity of the latter, but a product of strength greater than that of a similar product prepared by the previously known compression molding method is obtained regardless of the particular point in the mold at which the charge is initially placed.

The mold to be employed is of the general type adapted to compression molding and may be of nearly any desired shape or size. It should, of course, be provided with male and female sections, so that the male section may be projected within the female and cause the resin to occupy the entire final cavity within the mold. An air vent is also usually necessary, although the mold may be designed so that air will escape through the joint between the male and female sections. A mold of the well-known plunger type is satisfactory.

Figure 2:
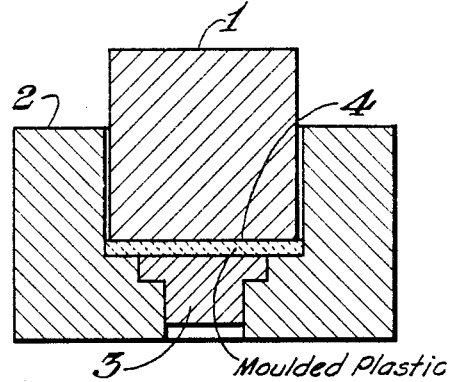
Figure 3:
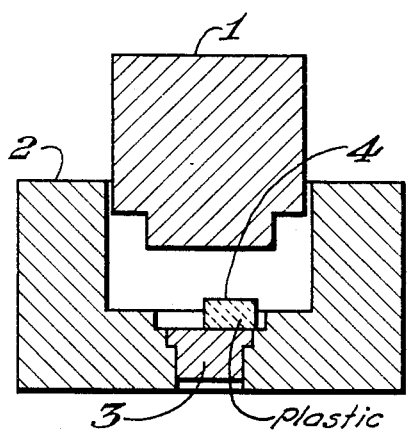
Figure 4:
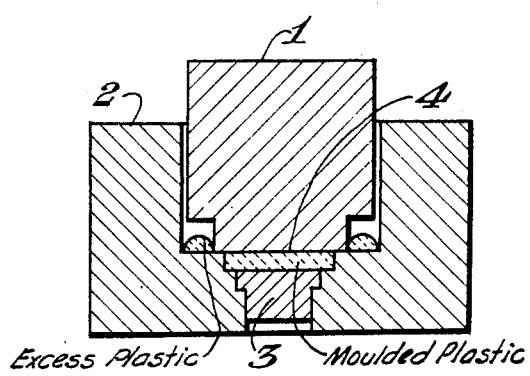

The accompanying drawing shows cross-sectional side views of molds suitable for use in practicing the invention and illustrates the location of the resin within the molds before and after molding. Figure 1 of the drawing shows a positive-acting compression mold just prior to the molding operation and Figure 2 is the same mold just after completion of said operation. Figure 3 shows a semi-positive-acting compression mold just prior to a molding operation and Figure 4 shows the same mold after completing the operation. In each of the Figures 1, 2, 3, and 4, the numeral 1 designates the male member of the mold, i. e., a plunger. Numeral 2 designates the female member of the mold. The latter is provided with the ejector 3, which may be raised after completion of the molding operations to force a molded article from the mold. The numeral 4 designates the resin within the mold. It will be understood that the invention is not restricted to employment of the particular molds shown in the drawing and that other compression molds may be used.

The variance in strength of the molded product with change in the molding temperature is dependent somewhat on the particular styrol resin under treatment. For instance, pure polystyrene test pieces compression molded in accordance with the invention at temperatures between 130° and 150° C. were considerably stronger than corresponding pieces which had been compression molded at the same temperatures and pressures by the compression molding method heretofore known, but were somewhat weaker than corresponding test pieces made in accordance with the injection molding method. On the other hand, test pieces prepared by my compression molding method at temperatures between 110° and 125° C. had greater transverse impact strength, as measured by the method described in A. S. T. M. D48—36, than corresponding pieces made by either the injection molding method or the heretofore known compression molding method, and pieces made in accordance with the invention by molding polystyrene at temperatures between 110° and 117° C. had greater strength in all directions than the pieces made by injection molding or by the previously known compression molding method. Test pieces prepared by molding a co-polymer of styrene and 1 per cent by weight of tung oil at temperatures between 110° and 150° C. have considerably greater strength in all directions than similar pieces made either by the injection molding method or by the old compression molding method hereinbefore described. In general, the advantages of the invention are achieved by molding a styrol resin in accordance with my method hereinbefore described, at a temperature between 110° and 150° C., and such molding of polystyrene may advantageously be carried out at temperatures below 125° C., and is preferably carried out at temperatures between 110° and 117° C.

The following examples describe certain experiments illustrating the invention and its advantages, but do not limit the invention.

Example 1

The purpose of this example is to present data showing the strength characteristics of polystyrene test pieces molded by the three methods hereinbefore described. The polystyrene employed was prepared by heating styrene of 99.5 per cent purity at a temperature of 125° C. for three days, pulverizing the resultant solid material, and heating the powder for two hours at a temperature of 80° C. and an absolute pressure of about 5 millimeters of mercury. The molds employed were of such size that each molded test piece had the dimensions 0.1 inch x 1.75 inches x 2.5 inches. The injection molded test pieces were prepared using a mold provided with the gate at one end so as to produce longitudinal flow. In preparing these injection molded pieces, the powdered polystyrene was heated to a temperature of 204° C. and forced through the gate into the mold under sufficient pressure to completely fill the latter. The following Table 1 gives the longitudinal impact strength of samples cut lengthwise from these test pieces; the transverse impact strength of pieces cut crosswise from the test pieces; and the tensile strength of each piece in pounds per square inch cross-section of the same. Each impact strength was measured by procedure similar to that described in A. S. T. M. D48—36. The test pieces made in accordance with the previously known compression molding method were prepared by filling a vertical plunger type mold with the granular polystyrene, heating the mold and its charge to the temperature stated in Table 1, and applying sufficient pressure by means of the plunger to press the charge into a uniform test piece having the dimensions hereinbefore stated. The longitudinal impact strength, transverse impact strength, and tensile strength of these test pieces were determined in the same manner as with the injection molded test pieces. In preparing test pieces in accordance with the invention, the polystyrene powder was first heated and compressed to a billet of size sufficient to fit within the vertical plunger type mold and occupy not more than one-half the horizontal cross-sectional area of the mold, after which the mold and its contents were heated to the temperature stated in Table 1, and sufficient pressure was applied to cause the polystyrene to flow and fill the cavity of the mold, forming a test piece having the dimensions hereinbefore stated. The strength characteristics of these test pieces were measured in the manner just given. In the following table, the injection molding method is referred to as "injection;" the previously known compression molding method is termed "compression-old;" and the method of this invention is referred to as "compression-new."

*Table 1*

| Molding method | Temp., °C. | Strength characteristics of molded polystyrene | | |
| --- | --- | --- | --- | --- |
| | | Longitudinal impact, pounds | Transverse impact, pounds | Tensile, lbs./sq. in. |
| Injection | 204 when injected. | 2.5 | 1.4 | 7,916 |
| Compression, old | 110 | 1.6 | 0.7 | 6,462 |
| Compression, new | 110 | 5.0 | 2.0 | 9,456 |
| Compression, old | 130 | 1.0 | 1.0 | 5,712 |
| Compression, new | 130 | 1.5 | 0.9 | 7,578 |
| Compression, old | 150 | 0.6 | 0.6 | 5,416 |
| Compression, new | 150 | 0.8 | 0.6 | 6,159 |

Example 2

A co-polymer of styrene and tung oil was prepared by heating a solution of styrene and tung oil, containing 1 per cent by weight of the latter, at a temperature of 125° C. for 5 days, pulverizing the product and heating the powder for two hours at a temperature of 80° C. and an absolute pressure of 5 millimeters of mercury. Test pieces having the dimensions 0.1 inch by 1.75 inches by 2.5 inches were prepared by injection molding, by compression molding in accordance with the previously known method and by pressure molding in accordance with the present invention, the procedures being similar to those described in Example 1. The strength characteristics of each test piece were then determined as in Example 1. The following Table 2 gives the molding temperature, the longitudinal impact strength, transverse impact strength, and tensile strength determined for each test piece. The terms used in Table 2 in referring to the three methods of molding are the same as were employed in Table 1.

*Table 2*

| Molding method | Temp., °C. | Strength characteristics of molded co-polymer | | |
|---|---|---|---|---|
| | | Longitudinal impact, pounds | Transverse impact, pounds | Tensile, lbs./sq. in. |
| Injection | 232 when injected. | 1.5 | | 7,110 |
| Compression, old | 120 | 0.6 | | 5,927 |
| Compression, new | 120 | 5.0 | 2.7 | 7,956 |
| Compression, old | 130 | 0.6 | | 5,765 |
| Compression, new | 130 | 3.7 | 2.5 | 8,816 |
| Compression, old | 150 | 0.7 | | 6,733 |
| Compression, new | 150 | 3.3 | 1.9 | 8,832 |

The new molding method hereinbefore described is not limited to molding of the particular resins named, but may advantageously be applied in molding any styrol resin capable of being molded at a temperature below 150° C.

Other modes of applying the principle of the invention may be employed instead of those explained, change being made as regards the method herein described, provided the step or steps stated by any of the following claims or the equivalent of such stated step or steps be employed.

I therefore particularly point out and distinctly claim as my invention:

1. The method of molding a styrol resin which comprises charging a mold with a quantity of the resin sufficient to fill the mold upon application of pressure to the resin in such manner that the latter occupies not more than one-half of the cross-sectional area of the mold, and thereafter heating the charge at a molding temperature not exceeding 150° C. while applying sufficient pressure thereon to cause the resin to flow and fill the cavity of the mold.

2. The method of molding a styrol resin which comprises placing within a mold having male and female sections a piece of said resin of such size that it occupies not more than one-half of the cross-sectional area of the mold, but is sufficient to flow and fill the mold as the size of the mold cavity is reduced by pressing a male member of the mold upon the charge therein, and heating the resin at a temperature between 110° and 150° C. while applying sufficient pressure thereon to cause the resin to flow and fill the cavity of the mold.

3. The method of molding a styrol resin which comprises placing at one extremity within a mold having male and female sections a piece of said resin of such size that it occupies not more than one-half of the cross-sectional area of the mold, but is sufficient to flow and fill the mold as the size of the mold cavity is reduced by pressing a male member of the mold upon the charge therein, and heating the resin to a temperature between 110° and 150° C. while applying sufficient pressure thereon to cause the resin to flow and fill the cavity of the mold.

4. The method of molding polystyrene which comprises charging a mold having male and female sections with a quantity of polystyrene sufficient to fill the mold upon pressing the polystyrene therein, the polystyrene being charged into the mold in such manner that it occupies not more than one-half of the cross-sectional area of the mold, and thereafter heating the charge at a molding temperature not exceeding 150° C. while applying sufficient pressure thereon to cause the polystyrene to flow and fill the cavity of the mold.

5. The method of molding polystyrene which comprises placing within a mold having male and female sections a piece of said polystyrene of such size that it occupies not more than one-half of the cross-sectional area of the mold, but is sufficient to flow and fill the mold as the size of the mold cavity is reduced by pressing a male member of the mold upon the charge therein, and heating the polystyrene at a temperature between 110° and 150° C. while applying sufficient pressure thereon to cause it to flow and fill the cavity of the mold.

6. The method of molding polystyrene which comprises placing at one extremity within a mold having male and female sections a piece of polystyrene of such size that it occupies not more than one-half of the cross-sectional area of the mold, but is sufficient to flow and fill the mold as the size of the mold cavity is reduced by pressing a male member of the mold upon the charge therein, and heating the polystyrene to a temperature between 110° and 150° C. while applying sufficient pressure thereon to cause it to flow and fill the cavity of the mold.

7. The method of molding polystyrene which comprises charging a mold having male and female sections with a quantity of polystyrene sufficient to fill the mold upon pressing the polystyrene therein, the polystyrene being charged into the mold in such manner that it occupies not more than one-half of the cross-sectional area of the mold, and heating the polystyrene at a molding temperature not exceeding 125° C. while applying sufficient pressure thereon to cause the polystyrene to flow and fill the cavity of the mold.

8. The method of molding polystyrene which comprises placing within a mold having male and female sections a piece of polystyrene of such size that it occupies not more than one-half of the cross-sectional area of the mold, but is sufficient to flow and fill the mold as the size of the mold cavity is reduced by pressing a male member of the mold upon the charge therein, and heating the polystyrene at a molding temperature not exceeding 125° C. while applying sufficient pressure thereon to cause the polystyrene to flow and fill the cavity of the mold.

9. The method of molding polystyrene which comprises charging a mold having male and female sections with a quantity of polystyrene sufficient to fill the mold upon pressing the polystyrene therein, the polystyrene being charged into the mold in such manner that it occupies not more than one-half of the cross-sectional area of the mold, and heating the polystyrene at a temperature between 110° and 117° C. while applying sufficient pressure thereon to cause the polystyrene to flow and fill the cavity of the mold.

10. The method of molding polystyrene which comprises placing within a mold having male and female sections a piece of polystyrene of such size that it occupies not more than one-half of the cross-sectional area of the mold, but is sufficient to flow and fill the mold as the size of the mold cavity is reduced by pressing a male member of the mold upon the charge therein, heating the polystyrene to a temperature between 110° and 117° C. while applying sufficient pressure to cause the polystyrene to flow and fill the cavity of the mold.

ROBERT D. LOWRY.